Figure 1:
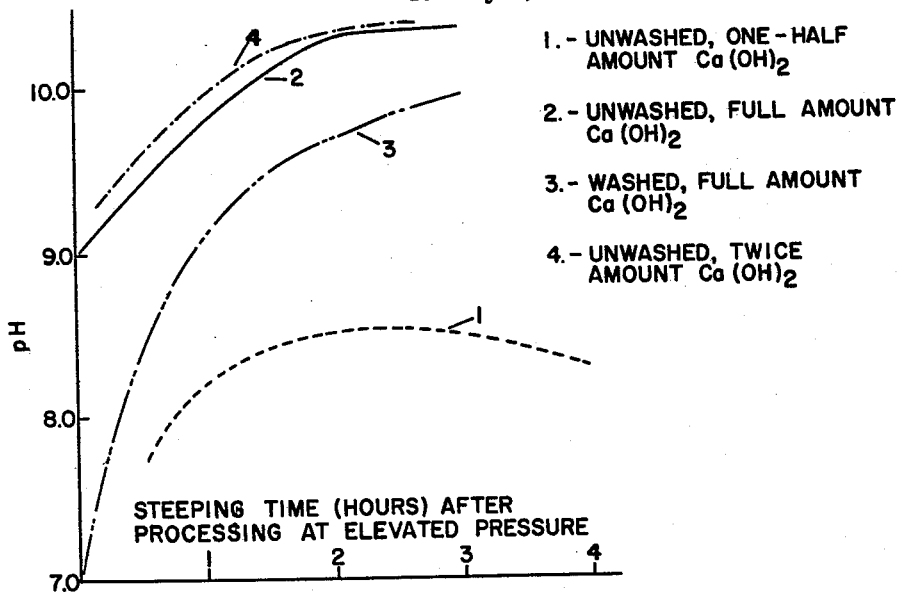

United States Patent Office 3,083,103
Patented Mar. 26, 1963

3,083,103
PROCESS FOR MAKING CORN MASA DOUGH
Edward E. Anderson, Lexington, Mass., and Jack D. Brown, Dallas, Tex.; said Anderson assignor, by mesne assignments, to Morton Foods, Inc., Dallas, Tex., a corporation of Texas
Filed May 9, 1962, Ser. No. 195,654
6 Claims. (Cl. 99—80)

This invention relates to corn dough suitable for deep-fat frying and to a process for preparing it. More particularly it is concerned with a process of the type described in which the dough is capable of being rolled into a thin sheet.

It has long been known that if whole kernels of corn are cooked in the presence of a small amount of an alkali such as calcium hydroxide and then the cooked product permitted to steep or soak for a period of from 18 to 24 hours that the resulting steeped product could, after washing, be ground to form a corn dough. This has been the basis of the making dough for tortillas and other corn products (see for example U.S. Patent No. 2,002,053).

In preparing the corn masa dough according to the prior art, a number of drawbacks are encountered which influence not only the economics of the production of the dough but also the final product in which the dough is used. These drawbacks include the extended soaking or steeping time which may be 18 to 24 hours, and the requirement for washing the processed corn kernels which in turn leads to an excessive loss in the usable portion of the kernel in forming the corn masa dough. Moreover, it is necessary to add water in the final grinding step which in the prior art is accomplished by stone grinders. The final product made in accordance with the prior art is relatively non-uniform in color and in texture due to the fact that the corn kernels are not treated uniformly. Moreover, the ground dough prepared by the prior art process is difficult if not impossible to sheet out for further processing and therefore must be extruded. Finally the prior art process has not permitted the attainment of certain desired texture and flavor properties as will be described below.

By the process of this invention it is possible to make a dough which can be readily sheeted out for subsequent treating such as by the process described in U.S. Patent No. 2,905,559. Moreover, the process permits the introduction of an improved and novel flavor while at the same time it imparts a shorter texture to the final corn chips made such as by the process described in U.S. Patent No. 2,905,559. The resulting product is uniform, pleasing to the eye and does not contain undesirably large black or dark specks throughout. Moreover, the process of this invention achieves marked economic advantages in that the processing time to convert the raw corn kernels to the masa dough is materially shortened (e.g., from about 20 to 24 hours to about 2 hours or less) while at the same time it permits the realization of increased yields amounting to 10% or more by weight over that of the prior art.

The process of this invention may be described as characterized by the step of processing corn kernels in the presence of a supersaturated solution of calcium hydroxide in water at a steam pressure ranging from about 5 to 25 p.s.i.g. for from about 40 to 5 minutes. The term "supersaturated" as hereinafter used means that the solute is added in quantities beyond the saturation point. Subsequent steeping or soaking requires from only 30 minutes to about 2 hours to give a ground corn masa dough having a pH of the level desired and a satisfactory flavor. This is in contrast to a steeping time of from 18 to 24 hours normally used in the prior art processes to attain the desired pH and flavor. The significance of pH control will be discussed below. The method of this invention not only reduces the processing time to as little as about one-tenth that previously required, but also eliminates the washing step, and permits the use of modern grinding, sheeting, docking and cutting techniques heretofore not applicable in the making of corn masa dough.

The corn kernels after the brief period of steeping (that is when they have reached a condition suitable for grinding) may be characterized as having appreciably all of the outer hulls loosened in a uniform manner and being subsequently uniformly penetrated with lime solution.

Figure 2:
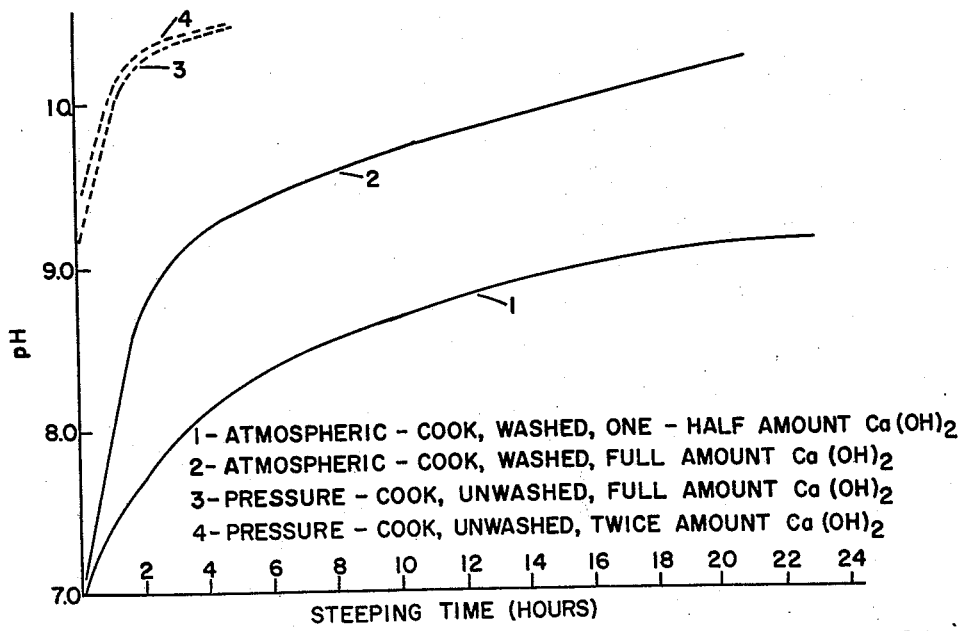

The product and process of this invention will now be further described in detail, and with reference to the accompanying drawings in which:

FIG. 1 is a plot of pH versus steeping time for corn masa doughs processed in laboratory equipment at elevated pressures with varying amounts of calcium hydroxide; and FIG. 2 is a plot of pH versus steeping time for corn masa dough processed in laboratory equipment at atmospheric pressure and elevated pressure.

In the processing of the corn kernels two conditions are essential, and they distinguish the process of this invention over the prior art. These conditions are that the corn kernels are processed under pressure and that the amount of calcium hydroxide used is in far greater concentrations than that ever previously employed. The significance of these two conditions will be further discussed along with the relation which they bear to each other.

In the use of elevated processing pressures and, of course, simultaneously elevated temperatures in an agitating pressure cooker, it is possible to obtain essentially uniform treatment of the kernels which in turn succeeds in loosening substantially all of the hulls, but only the hulls. Thus a comparison of individual corn kernels processed by the practice of this invention and the prior art shows a marked difference in the appearance of the kernels. Whereas kernels processed according to this invention are uniform in color, those processed in accordance with the prior art have dark areas and the cellulosic hull associated with the kernel is still tightly retained in certain areas. Moreover the kernels processed according to the prior art do not give an overall uniform surface but are pitted indicating that the calcium hydroxide in the quantity present has attacked certain portions of the hull but not others. Thus the process of this invention may be distinguished over the prior art as not only producing a uniform kernel suitable for further processing, but as one which converts the corn kernel structure so that the calcium hydroxide may penetrate uniformly and rapidly in the subsequent soaking or steeping process.

Inasmuch as a "limed" flavor is traditionally associated with foodstuffs made from corn dough it will be preferable to effect the strongly alkaline treatment of corn kernels through the use of calcium hydroxide. However, the treatment may incorporate the use of small quantities of other alkalies including those naturally present in the water used. Thus lime does not have to be the sole source of alkali, but it should furnish a substantial portion of the alkali treatment. For simplicity of presentation, the following description will be directed only to the use of calcium hydroxide, it being understood that small amounts of such materials as NaOH, KOH, $Na_2CO_3$, $NH_4OH$ and the like may be used in conjunction with $Ca(OH)_2$ to achieve the high pH's.

The large quantity of calcium hydroxide present is believed to play a double role, a role which is materially enhanced by the use of high pressures and temperatures in the processing or heating step. During the processing at elevated pressures the calcium hydroxide in the quantity used, and under the conditions employed, makes it possible to loosen the hulls of the corn kernels rapidly and uniformly and thus to convert the kernels to a state where they are very receptive to calcium hydroxide treatment in steeping. Subsequently when the processed kernels are soaked, the condition to which they are converted in the processing step at elevated pressures permits the calcium hydroxide to enter uniformly into the kernels and to give a material having a pH higher than would otherwise be obtainable.

In describing the process and product of this invention the attainment of certain pH's has been noted. It has been found that such an attainment of high pH is necessary to develop the improved flavor of the finally deep-fat fried corn masa dough. A high pH gives the final product a unique flavor of blended lime and corn which is highly desirable in this type of product, and which cannot be obtained unless the higher pH levels are reached.

The attainment of a uniform kernel after processing at elevated pressures and temperatures is of primary importance for several reasons, one of which is that it permits the elimination of the washing step. This in turn results in a better yield, permits the use of a metal grinder and eliminates the addition of water during grinding, the latter apparently influencing the further processing characteristics of the corn masa dough.

The elimination of the washing step means that there remains in the dough certain materials which would otherwise be removed by washing. These materials in turn appear to give the dough a more plastic character which permits it to be sheeted out continuously, and which in turn also results in a final crisper corn chip product which has a shorter texture. Moreover, this material which would otherwise be removed in washing appears to serve as a lubricant during grinding, thus permitting modern grinding equipment to replace the old stone grinding which required the addition of water during the process.

It may be seen from the above discussion that the process of this invention results in an improved product which can be made in approximately one-tenth of the time previously required and that the final product has in fact a uniquely better flavor and better texture than previously obtainable.

An important step in the process of this invention is the cooking or processing of whole corn kernels (usually a mixture of white and yellow corn) under pressure. This processing is carried out in the presence of a supersaturated water solution of calcium hydroxide. The temperature attained in this processing will, of course, correspond to the boiling point of the solution (approximately the boiling point of water) at the pressure employed.

It will be understood that the overall cooking period will include the time necessary to bring the corn-lime slurry up to a predetermined pressure or temperature (called "come-up time") as well as the actual holding of the mixture at the desired pressure-temperature conditions for a predetermined time, e.g., 20 minutes at 240° F.

We have found that steam pressures ranging from 5 to 25 p.s.i.g. may be conveniently used while a preferable range is from about 10 to 15 p.s.i.g. The overall cooking period will, of course, vary primarily with the pressures used but may also be influenced by several other factors to be discussed below. Generally when the lower pressures in the range stated are used, the actual processing after attainment of the desired processing temperature will be continued from about 20 to 40 minutes, whereas this may be shortened to from about 5 to 15 minutes when the higher pressures in the range specified are employed. It may be seen that there is therefore involved a time-temperature factor, and generally the higher the temperature and pressure used, the shorter the time of actual processing may be.

During this processing at elevated temperatures it has been found convenient to continuously agitate the mass of corn kernels in the lime solution. Although agitation speeds up to about 60 r.p.m. may be conveniently used, it is preferred that the agitation rates are from about 20 to 60 r.p.m. At the beginning of the cooking process it may be desirable to agitate the mass more rapidly and then to reduce the agitation rate when the mass of corn kernels has come up to the cooking temperature employed. However, a variable agitation rate is not required in the practice of our invention.

It has also been found preferable during come-up time to bring the kernels in the water solution up to processing temperature as rapidly as possible, and this is conveniently done by injecting live steam at the beginning of the cooking process. If steam injection is used, it is generally possible to decrease the overall cooking time by as much as 10 to 30 minutes, depending upon the size of the batch and the pressure vessel.

As noted above, an amount of calcium hydroxide is added to form a supersaturated solution for the cooking and subsequent soaking of the corn kernels. It is believed that this is very effective for the reason that first as the calcium hydroxide acts to loosen the hull of the kernels and then to enter and modify the remaining solution of the corn kernel, it is necessary to always have in the water an excess amount of calcium hydroxide which serves as a reservoir for this reagent. Thus, as the hulls are loosened and subsequently as the calcium hydroxide begins to penetrate the corn kernels, there always remains in the solution sufficient calcium hydroxide to continue kernel penetration and to effect rapid, uniform and complete reaction between the calcium hydroxide and the corn. It will be seen from data presented below and the discussion of FIGS. 1 and 2, that the pH of the corn kernel increases very rapidly and that the reaction rate between the calcium hydroxide and the corn is far greater than that which would be explained by the general rule that a reaction rate doubles with every 10° C. increase in reaction temperature.

The amount of calcium hydroxide used may conveniently be expressed as a weight percent of the corn being treated. In the prior art this amounted to from about 0.25% calcium hydroxide (see U.S. Patent No. 2,002,053) to about 0.75% by weight of the corn. In the process of this invention it is preferable to use at least 1.5, and generally from 1.5 to 2% calcium hydroxide by weight of the corn kernels. The use of this quantity of calcium hydroxide in processing the corn kernels under elevated pressures and with agitation during processing achieves the final product desired. Concentrations greater than about 1.5 to 2% may of course, be used, but they contribute little, if anything, to the improvement of the process.

After the kernels have been processed at elevated temperatures and pressures with the amount of calcium hydroxide indicated, they may be cooled rapidly, i.e., to between about 160 to 200° F., such as by adding a quantity of cold water to the cooked mixture which contains at this stage corn kernels with loosened, softened hulls, calcium hydroxide solution and some hull material which has been removed. Quick cooling is preferred since it appears to shorten the subsequent steeping time but it is not necessary. The mixture whether or not it has been cooled is permitted to steep for from about one-half to two hours. (This is in contrast to the long steeping periods required e.g. 8 to 24 hours when cooking is done at atmospheric pressure and with small amounts of calcium hydroxide.) It has been found desirable to periodically agitate the mixture during this steeping. The very rapid reaction between the calcium hydroxide and the remaining portion of the corn kernel is indicated below in the pH measurements made at specific time intervals during the soaking or steeping step. When a sample of steeped corn, after grinding, has reached a pH of about 8.5 or higher, it is ready to be ground into the masa dough. The reacted corn kernels are not washed as in the prior art. It is only necessary to drain off any excess liquid and to introduce the reacted or modified kernels directly into the grinder.

The very short steeping times which may be used and the elimination of the washing step are both results of the use of pressure and the specified amount of calcium hydroxide in accordance with this process. This does not mean, of course, that our process requires short steeping times or that the processed corn cannot be washed prior to grinding. However, rapid steeping and elimination of washing contributes materially to our overall process.

In accordance with this invention, grinding is accomplished in a meat grinder or similar device and it is not necessary, in fact it is not desirable, to add any additional quantity of water during grinding. It appears that the material which is left on the product by virtue of the fact that it is not washed, serves as a lubricant in grinding. In the prior art process where grinding is with stone grinders, it is necessary to add water in this step. A preferred method of grinding the process and steeped kernels is disclosed in our copending application Serial No. 184,442 which is assigned to the same assignee of this application.

The material after grinding to the desired degree may be rolled and sheeted out directly to the desired end thickness without any further treatment. This material, as it comes from the grinder, is more plastic and pliable than that which is produced by grinding with stones as has previously been done. It is this plastic or pliable nature which permits the ground material to be rolled and sheeted out directly on a pastry canvas or conveyor belt and then to be handled as a continuous sheet for further processing such as perforating and cutting as desired in U.S. Patent No. 2,905,559.

The following examples, which are meant to be illustrative and not limiting, are given to further describe this invention.

*Example I*

Into a retort vessel equipped with an agitator were added 74 pounds of water and 0.72 pound of calcium hydroxide U.S.P. grade. The mixture was agitated briefly to thoroughly mix in the calcium hydroxide and then 24 pounds of yellow corn and 16 pounds of white corn were added. The retort was closed, steam turned on and the agitator started. The air contained in the retort was exhausted and after the corn in the calcium hydroxide solution was brought up to 250° F. it was processed for 15 minutes. The pressure in the retort was slowly vented to the atmosphere until an internal pressure of about 3 p.s.i. was achieved and the mixture was then discharged into a container containing 17 pounds of cooling water to reduce the overall temperature of the mixture to 190° F.

The corn was permitted to steep in the liquor and periodically stirred until the pH of the ground, unwashed corn reached 9.6. This required approximately one hour. The excess liquid in the mixture was then drained off through a vibrating coarse screen. The resulting corn slurry was ground in a metal grinder of the meat grinder type to give a plastic dough which then could be sheeted out through appropriate rollers into a thin dough sheet which did not stick, i.e., it broke freely from the rollers and from the pastry canvas. The yield in this example was 76 pounds of drained corn prior to grinding.

*Example II*

The process of Example I was repeated except that the steeped corn just before grinding was washed, as is required in the prior art. The resulting drained corn weighed about 66 pounds, which indicates a loss of about 13% by weight of the corn brought about in washing. Moreover, it was found that the washed corn could not be ground in the meat grinder for in removing this mixture of lime and dissolved corn lubricating properties were removed and the more compact and drier kernels of corn greatly hindered, or even prevented, the grinding of the corn.

A number of samples of corn masa dough were prepared, on the scale of Examples I and II, using both atmospheric and elevated pressures for processing and using various amounts of calcium hydroxide. The data thus obtained are best illustrated in FIGS. 1 and 2. In these figures, the term "full amount $CA(OH)_2$" is used to designate the quantity of calcium hydroxide required in the practice of this invention. Thus, in this terminology, "one-half amount $Ca(OH)_2$" represents the quantity used in the prior art.

FIG. 1 illustrates the effect of washing the corn kernels after processing (as is done in the prior art) and also the effect of the use of varying amounts of calcium hydroxide in the processing.

In FIG. 1 the effect of washing the processed corn kernels on pH is clearly illustrated in curves 2 and 3. Curve 2, which represents the process of this invention, both with respect to non-washing and to the use of the specified quantity of calcium hydroxide, shows that at the beginning of the steeping process on samples prepared in accordance with and on the scale of the examples, the pH of the corn is about 9 and that it reaches its maximum of between 10.2 and 10.4 in from about one-half to two hours. (It should be noted that the pH of raw unprocessed corn is about 6.6.) In contrast to this the washed corn as shown in curve 3 has a pH of about 7 at the beginning of the steeping time and that after an hour and one-half it has reached about 9.6. Although pH values within the minimum required for further processing can be achieved by processing in accordance with curve 3 of FIG. 1, much longer steeping times are required than when the process of curve 2 is followed to achieve corresponding values of pH.

The contrast in the effect of the use of various amounts of calcium hydroxide is clearly illustrated in FIG. 2. In this case curve 1 represents the pH curve over the steeping time when about one-half the amount of calcium hydroxide specified in the practice of this invention (i.e., the amount used in the prior art practice) is used. It will be seen from curve 1 that the pH even after four hours of steeping never reached what is considered to be the minimum requirement to produce the corn chip product having the unique desired flavor achieved by the process of this invention. In contrast to this, is curve 4 which illustrates the rate of pH increase achieved when twice as much calcium hydroxide than is specified in the practice of this invention is used. It will be seen that doubling the specified amount of the calcium hydroxide content in the processing liquor has little or no effect on pH, either in its rate of increase or in its maximum value. Thus FIG. 1 illustrates not only the importance of using the amount of calcium hydroxide specified but also the marked improvement which is obtained in not washing the corn kernels.

In FIG. 2 are also plotted data which compare the effect on pH of processing the corn at atmospheric pressure and at elevated pressures. Moreover, FIG. 2 illustrates the fact that increasing the amount of calcium hydroxide in processing under atmospheric conditions does not have the effect that it does in processing at elevated pressures and temperatures. Hence it is believed that FIG. 2 shows the synergistic effect of the combination of using both elevated pressures and temperatures and the materially increased quantity of calcium hydroxide required in the process of this invention. That is, the improvements achieved in this invention cannot be achieved by either the use of elevated pressures with the previously disclosed amount of calcium hydroxide (curve 1 of FIG. 1), or by the use of atmospheric processing with quantities of calcium hydroxide falling within the range specified in this invention (curve 2 of FIG. 2).

In large scale operations the actual pH values may vary somewhat from those given in the examples and curves set forth above. However, all of the same advantages are gained in practicing our process whether on a laboratory or a commercial scale.

Thus our invention provides a type of corn masa dough, heretofore unavailable, which lends itself to processing techniques such as the use of metal grinders, rolling or sheeting equipment and dockers. Moreover, the process of this invention reduces the time for forming the masa dough to about one-tenth that previously required. Finally, the corn chip product formed by deep-fat frying the masa dough of this invention has a new, unique flavor and a highly desirable short texture.

It will thus be seen that the objects set forth above, among those made apparent from the preceding description are efficiently attained, and, since certain changes may be made in carrying out the above process without departing from the scope of the invention, it is intended that all matter contained in the above description shall be interpreted as illustrative and not in a limiting sense.

This application is a continuation-in-part of our copending application Serial No. 851,734 filed November 9, 1959.

We claim:
1. Process for preparing a corn masa dough suitable for deep-fat frying, comprising the steps of
   (a) processing corn kernels in a strongly alkaline solution, in which substantially all of the alkalinity is contributed by calcium hydroxide, at a pressure ranging from about 5 to 25 p.s.i.g. for from about 40 to 5 minutes;
   (b) steeping the resulting processed corn kernels for from about 30 minutes to two hours;
   (c) grinding the steeped kernels to form said corn masa dough;
the alkalinity of said solution used in step (a) being sufficient to give the corn kernels in ground form a pH of at least 8.5 at the end of said steeping step.

2. Process for preparing a corn masa dough suitable for deep-fat frying, comprising the steps of processing corn kernels in the presence of a supersaturated solution of calcium hydroxide in water wherein said calcium hydroxide is present in an amount equivalent to at least 1.5% by weight of said corn kernels and at a pressure ranging between 5 to 25 p.s.i.g. for a time from about 40 to 5 minutes, rapidly cooling the resulting processed corn by adding sufficient cold water to reduce the temperature to between about 160 and 200° F., steeping it in the residual liquid for from 30 to 120 minutes, removing the excess liquid and grinding the resulting corn slurry thereby to form a dough.

3. Process in accordance with claim 2 further characterized by agitating the mixture of said corn kernels and said solution during said processing first at a rapid rate and then subsequently at a decreased rate when said corn kernels have come to constant temperature in said processing step.

4. Process in accordance with claim 2 further characterized by the step of rapidly bringing said corn kernels to constant temperature at the beginning of said processing step.

5. Process in accordance with claim 4 wherein said step of rapidly bringing said corn kernels to constant temperature comprising injecting live steam into the processing mixture.

6. Process for preparing a corn masa dough suitable for deep-fat cooking including the steps of processing corn kernels in calcium hydroxide, steeping the processed kernels for at least 30 minutes, and grinding the steeped kernels thereby to form said corn masa dough, characterized in that said processing comprises cooking said kernels in a supersaturated solution of calcium hydroxide in water at a pressure ranging from about 5 to 25 p.s.i.g. for from about 40 to 5 minutes, the amount of calcium hydroxide being at least 1.5% by weight of said kernels.

References Cited in the file of this patent

UNITED STATES PATENTS

| | | |
|---|---|---|
| 563,860 | Hopkins | July 14, 1896 |
| 826,983 | Wreford | July 24, 1906 |
| 1,586,869 | Wesener | June 1, 1926 |
| 2,002,053 | Doolin | May 21, 1935 |
| 2,704,257 | De Sollano et al. | Mar. 15, 1955 |
| 2,905,559 | Anderson et al. | Sept. 22, 1959 |